United States Patent Office 3,296,296
Patented Jan. 3, 1967

3,296,296
DISILAALKANES
James A. Webster, Dayton, Ohio, assignor to Monsanto Research Corporation, St. Louis, Mo., a corporation of Delaware
No Drawing. Filed June 13, 1963, Ser. No. 287,472
12 Claims. (Cl. 260—448.2)

This invention relates to organic silicon compounds and more particularly provides certain new and valuable higher alkyl-substituted disilaalkanes and the method of preparing the same. The invention also provides functional fluid compositions comprising the new compounds, and the methods of actuating a power-transmitting device wherein said compositions are employed.

The new compounds have the formula

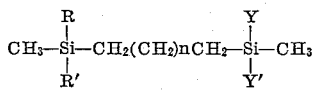

wherein R and Y are selected from the class consisting of methyl and alkyl of from 6 to 10 carbon atoms, and R' and Y' are alkyl of from 6 to 10 carbon atoms and $n$ is a number of 3 to 6.

According to the invention, the presently provided disilaalkanes are prepared by reaction of an appropriate halogen-substituted disilaalkane with a Grignard reagent, i.e., an appropriate haloalkylmagnesium substantially according to the following scheme when, e.g., each of R, R', Y and Y' of the above formula are hexyl:

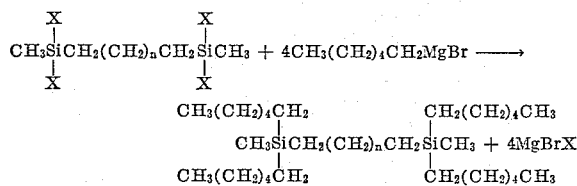

wherein X is halogen having an atomic weight of above 35.

The halogen of the halosilaalkane reactant may be substituted with diverse radicals by reaction with first a quantity of haloalkylmagnesium which is insufficient for replacement of all the silicon-bonded halogen, and subsequent reaction or reactions of the partially substituted halodisilaalkane with one or more different haloalkylmagnesium compounds. Operating in this manner a variety of substitutions are obtainable. Thus, to prepare a compound in which each of R and R' is different, 2,2,8,8-dibromo-2,8-disilanonane is first reacted with a molar equivalent of bromooctylmagnesium to give 2-octyl-2,8,8-tribromo-2,8-disilanonane, the latter is condensed with 1 molar equivalent of bromohexylmagnesium to give 2-octyl-8-hexyl-2,8-dibromo - 2,8 - disilanonane, which is then condensed with 2 molar equivalents of bromomethylmagnesium to give 2,8-dimethyl-2-octyl-8-hexyl-2,8-disilanonane. If it is desired to prepare a compound in which not only R and R', but also Y and Y' are different, then instead of using two molar equivalents of the bromomethylmagnesium reactant in said last step, there is used one mole each of two different reactants.

The tetrahalodisilaalkanes which serve as starting materials for preparation of the present disilaalkanes are readily available by the reaction of a dienic hydrocarbon with dichloromethylsilane. For example, reaction of 1,5 - hexadiene with dichloromethylsilane yields tetrachloro-2,9-disiladecane:

2Cl₂CH₃SiH + CH₂=CHCH₂CH₂CH=CH₂ ⟶

Reaction of the above tetrachloro compound with an appropriate Grignard reagent, e.g., one of the present higher bromoalkylmagnesiums, results in replacement of one or more of the chlorine atoms, depending upon the quantity of said Grignard reagent, by the higher alkyl radical.

Other tetrahalodisilaalkanes which are useful for preparation of the present aryl disilaalkanes are generally those in which there are present in the alkane chain joining the two silicon atoms from 5 to 8 methylenic radicals. Thus by employing the 2,2,8,8-tetrabromo-2,8-disilanonane which is obtained from dibromomethylsilane and 1,4-pentadiene, there are prepared by reaction with an appropriate Grignard reagent, a compound having at least one higher alkyl substituent at the silicon atom of the disilanonane. Similarly useful are the 2,2,10,10-tetrahaloundecanes which are obtained by reaction of a dihalomethylsilane and 1,6-heptadiene, or the 2,2,11,11-tetrahaloundecanes which are obtained by reaction of a dihalomethylsilane, e.g., dichloro-, dibromo-, or diiodomethylsilane and 1,7-octadiene. It will be noted that all of the above-mentioned tetrahalodisilaalkanes possess a methyl radical attached to the silicon. For preparing Si-alkyl disilaalkanes having optimum functional fluid properties we have found that advantageously a methyl group and one or two $C_6$–$C_{10}$ alkyl groups should be linked to each silicon. Hence the use of tetrahalodisilaalkanes having a methyl radical attached to the halo-bearing silicon atom is a convenient means of preparing the presently provided mixed, higher alkyl disilaalkanes. However, they may also be prepared by reaction of Grignard reagents with an α,α,α,ω,ω,ω-hexahalodisilaalkane, employing a haloalkylmagnesium as one of the reagents in a quantity sufficient to replace from 2 to 4 of the halogens by higher alkyl and then replacing residual halogen by methyl groups. The present disilaalkane functional fluids must contain at least one higher alkyl substituent at each silicon. The Grignard reagents which are used to introduce higher alkyl substitution by replacement of halogen from the halodisilaalkane are, e.g., iodohexylmagnesium, bromo-(2-ethylhexyl)magnesium, bromodecylmagnesium, fluoroheptylmagnesium, bromononylmagnesium, chlorodecylmagnesium, bromohexylmagnesium, bromo - (2-ethylbutyl)magnesium, chloro(2-butylhexyl)-magnesium, etc.

Examples of higher alkyl substituted disilaalkanes provided by the invention are shown in the table below:

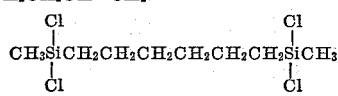

| R= | R'= | n= | Y= | Y'= |
|---|---|---|---|---|
| methyl | hexyl | 3 | hexyl | hexyl. |
| methyl | octyl | 4 | octyl | octyl. |
| methyl | heptyl | 3 | heptyl | heptyl. |
| methyl | 2-Et hexyl | 4 | methyl | 2-Et hexyl. |
| methyl | nonyl | 4 | methyl | nonyl. |
| methyl | decyl | 4 | decyl | decyl. |
| methyl | decyl | 5 | methyl | decyl. |
| hexyl | hexyl | 4 | hexyl | hexyl. |
| heptyl | heptyl | 5 | heptyl | heptyl. |
| octyl | octyl | 4 | octyl | octyl. |
| nonyl | nonyl | 3 | nonyl | nonyl. |
| decyl | decyl | 3 | decyl | decyl. |
| methyl | heptyl | 6 | methyl | heptyl. |
| methyl | hexyl | 3 | methyl | hexyl. |
| methyl | octyl | 3 | octyl | octyl. |
| methyl | decyl | 3 | methyl | decyl. |
| methyl | hexyl | 6 | octyl | octyl. |
| methyl | hexyl | 3 | octyl | decyl. |
| hexyl | decyl | 4 | octyl | nonyl. |
| hexyl | decyl | 3 | hexyl | decyl. |

Compounds of the above formula, where the total number of carbon atoms in the R, R', Y and Y' is less than 14, i.e., wherein R and Y are methyl and R' and/or Y' is lower than hexyl, are unsuitable for use as functional fluids owing to their low boiling points. Compounds in which hydrogen, rather than the methyl group or the higher alkyl group is attached to the silicon are generally unstable to moisture. Within the above-stated limits of the R, R', Y and Y' substituents, the variation in chain length of the bridging alkylene —$CH_2(CH_2)_nCH_2$— is unimportant, so long as the value of $n$ is not less than 3 and not greater than 6. Since 1,5-hexadiene is readily available, the starting tetrahaloalkane is advantageously a 2,2,9,9-tetrahalo-2,9-disiladecane. For optimum thermal and oxidative stability, the alkylene radical is unbranched.

Particularly valuable are compounds having two methyls and one higher alkyl at each of the silicon atoms. Such compounds have the formula

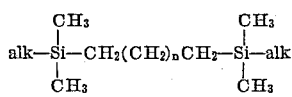

wherein alk is alkyl of 6 to 10 carbon atoms and $n$ is a number of 3 to 6. Examples thereof are 7,7,13,13-tetramethyl-7,13-disilanonadecane,
8,8,14,14-tetramethyl-8,14-disilaheneicosane,
7,7,13,13-tetramethyl-5,18-diethyl-7,13-disilanonadecane,
11,11,17,17-tetramethyl-11,17-disilaheptacosane,
7,7,14,14-tetramethyl-7,14-disilaeicosane,
9,9,16,16-tetramethyl-9,16-disilatetracosane,
7,7,15,15-tetramethyl-7,15-disilaheneicosane,
10,10,18,18-tetramethyl-10,18-disilaheptacosane,
10,10,19,19-tetramethyl-10,19-disilaoctacosane,
7,7,14,14-tetramethyl-7,14-disilatetracosane,
9,9,16,16-tetramethyl-6,23-diethyl-9,16-disilatetracosane,
11,11,20,20-tetramethyl-11,20-disilatriacontane, etc.

Compounds having one methyl radical and two $C_6-C_{10}$ alkyl groups at each silicon atom are outstanding functional fluids because in them are blended good thermal stability, low volatility, and good viscosity characteristics. Such compounds have the formula

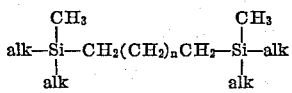

wherein alk and $n$ are as defined above. Examples of such compounds are 7,13-dihexyl-7,13-dimethyl-7,13-disilanonadecane,
7,14-dihexyl-7,14-dimethyl-7,14-disilaeicosane,
8,15-diheptyl-8,15-dimethyl-8,15-disiladocosane,
9,16-dimethyl-9,16-dioctyl-9,16-disilatetracosane,
11,18-didecyl-11,18-dimethyl-11,18-disilaoctacosane,
7,15-dihexyl-7,15-dimethyl-7,15-disilaheneicosane,
11,20-didecyl-11,20-dimethyl-11,20-disilatriacontane,
5,19-diethyl-7,14-dihexyl-7,14-dimethyl-7,14-disilaeicosane,
7,14-dihexyl-7,14-dimethyl-7,14-disiladocosane, etc.

Reaction of the haloalkylmagnesium with the halodisilaalkanes to give the presently provided higher-alkyl substituted disilaalkanes may be conducted at ordinary, decreased or increased temperature and in the presence of an inert liquid diluent or solvent. Generally, the haloalkylmagnesium compound, i.e., the Grignard reagen, is present in the solvent in which it was prepared, e.g., by treating the methyl or $C_6-C_{10}$ alkyl halide with magnesium in ether. To the solution of Grignard reagent there is then added the halosilaalkane. Generally, the reaction is exothermic and application of heat is not necessary. The halodisilaalkane is simply contacted with the Grignard solution, and the resulting mixture is allowed to stand until reaction is completed. However, in some instances, reaction time may be shortened by external heating. Temperatures of from, say 40° C. to refluxing may be advantageously employed for this purpose. Generally, temperatures of from, any, 20° C. to 120° C. are useful. Besides ethyl ether, useful diluents or solvents include, e.g., butyl ether, dioxane, diglyme, hexane, etc.

Since the higher alkyl-substituted disilaalkanes are formed through replacement of the silicon-halogen by the $C_6-C_{10}$ alkyl radical or by one such alkyl and the methyl radical, the reactants are employed in a ratio which is calculated to replace the desired number of halogens by the particular haloalkylmagnesium which is employed. The reactants are thus advantageously employed in stoichiometric proportions.

All of the reaction conditions, i.e., temperature, reactant proportions, reaction time, nature of the diluent, etc., can be readily arrived at by easy experimentation. Progress of the reaction can be followed by noting the formation of by-product magnesium halide and change in viscosity and/or by sampling the reaction mixture at intervals and determining the content of the desired product, e.g., by nuclear magnetic resonance analysis.

The presently provided $C_6-C_{10}$ alkyl-substituted disilaalkanes are stable, well-characterized materials which are of particular interest for use as functional fluids, since they are generally liquid over wide temperature ranges, possess high flash points and high ignition points and are characterized by very good resistance to heat, oxygen, and moisture. The decomposition point of 7,14-dihexyl-7,14-dimethyl-7,14-disilaeicosane, for example, is over 600° F. They remain liquid at temperatures which may be as low as, say, —70° F., and they remain liquid at temperatures which are substantially higher than 500° F. Hence they are eminently suited for use as hydraulic fluids, especially in hydraulic systems which are subjected to widely varying temperature conditions. The presently provided higher alkyl-substituted disilaalkanes possess good viscosity/temperature relationships, and are also useful, e.g., as heat-exchange media, gyro fluids and lubricants.

The invention is further illustrated by, but not limited to, the following examples:

EXAMPLE 1

Tetrachlorodisiladecane was prepared as follows: A mixture consisting of 21.2 g. (0.258 mole) of 1,5-hexadiene and 123.5 g. of dichloromethylsilane was cooled to 15° C., and a few drops of a dilute solution of $H_2PtCl_6$ catalyst in ethyl acetate was added. There was no reaction. Accordingly, the mixture was heated to 30° C. and more catalyst was added. An exothermic reaction was evidenced, and ice-cooling was used until vigorous reaction had ceased. Upon discontinuing the cooling, the temperature of the reaction mixture rose to 47° C. within a 15-minute period. Reaction continued, as evidenced by the elevated temperature, for about one hour. Then heat was applied to raise the temperature to reflux (55° C.) and heating at reflux was continued for about two hours. Distillation of the resulting reaction mixture gave 2,2,9,9-tetrachloro-2,9-disiladecane, B.P. 155° C./15 mm., $n_D^{25}$ 1.4655.

An ether solution of the Grignard reagent, bromohexylmagnesium was prepared by reacting 83.5 g. (0.5 mole) of n-hexyl bromide with 12.1 g. of magnesium in ether. To the resulting ether solution of Grignard reagent there was added 31.2 g. (0.07 mole) of the 2,2,9,9-tetrachloro-2,9-disiladecane prepared above. The whole was stirred at reflux overnight and then, after removing some of the ether, at 50–70° C. for several hours, it was hydrolyzed by treatment with aqueous ammonium chloride solution, filtered, and distilled to give the substantially pure 7,14-dihexyl-7,14-dimethyl-7,14-disilaeicosane, B.P. 196° C./0.05 mm., $n_D^{25}$ 1.4601, and showing the following nuclear magnetic resonance chemical shifts, using tetramethylsilane as reference:

| Chemical Shift (p.p.m.) | Relative Area | Assignment |
| --- | --- | --- |
| −1.28 broad | 63.8 | (—CH$_2$—). |
| 0.89 triplet | 63.8 | CH$_2$—(CH$_3$). |
| 0.68–0.23 | 63.8 | Si—(CH$_2$). |
| 0.0 | 63.8 | TMS standard. |
| +0.1 | 6.0 | Si—(CH$_3$). |

Infrared analysis of the compound also substantiates the structure.

EXAMPLE 2

The 7,14-dihexyl-7,14-dimethyl-7,14-disilaeicosane was evaluated as hydraulic fluid having a long range temperature of efficacy by determining its decomposition temperature, pour point, viscosity and vapor pressure. The following results were obtained:

The decomposition temperature, as determined with the isoteniscope, was found to be 606° F. The decomposition temperature is here defined as the temperature at which dp./dt. (rate of pressure rise) due to decomposition of the sample is 0.014 mm. Hg/sec.

The pour point of the compound, as determined by American Society for Testing Materials procedure D97–57, was found to be below minus 70° F.

Kinematic viscosity determination by ASTM procedure D445–T 1960 gave a value of 16.5 centistokes at 100° F. and 3.83 centistokes at 210° F.

Temperature for vapor pressure equal to certain pressures of mercury were determined to be as follows:

Temp., ° F.: Pressure, mm. Hg
384.8 _____ 0.05
521.6 _____ 10

From the above data, it is evident that the compound is a hydraulic fluid which, in the absence of any additive, is suitable for use at either extremely high or extremely low temperatures.

It is to be understood that the foregoing detailed description is merely given by way of illustration. It is obvious that many variations may be made therein without departing from the spirit and scope of the invention as defined in the appended claims. The presently provided disilaalkanes may be admixed in any proportion with other compositions having functional fluid properties, e.g., the polyphenyl ethers such as those containing 3 to 6 benzene rings, the polyesters, hydrocarbon oil lubricants, etc. Additives conventionally used in the functional fluid art, e.g., antioxidants, anti-corrosives, viscosity index-improving agents, etc., may be used.

What I claim is:
1. The compound of the formula

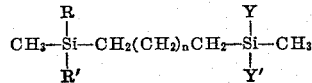

wherein R and Y are selected from the class consisting of methyl and alkyl of from 6 to 10 carbon atoms, R' and Y' are alkyl of from 6 to 10 carbon atoms and $n$ is a number of 3 to 6.

2. The compound of the formula

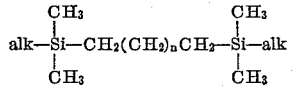

wherein alk is alkyl of from 6 to 10 carbon atoms, and $n$ is a number of 3 to 6.

3. The compound of the formula

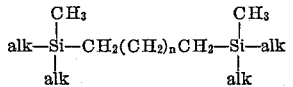

wherein alk is alkyl of from 6 to 10 carbon atoms, and $n$ is a number of 3 to 6.

4. 7,14-dihexyl-7,14-dimethyl-7,14-disilaeicosane.

5. A hydraulic system containing as the operative fluid the compound defined in claim 1.

6. A hydraulic system containing as the operative fluid the compound defined in claim 2.

7. A hydraulic system containing as the operative fluid the compound defined in claim 3.

8. A hydraulic system containing as the operative fluid the compound defined in claim 4.

9. The method of operating a fluid hydraulic system which comprises transmitting power in said system by the use of the compound of claim 1 as the operative fluid.

10. The method of operating a fluid hydraulic system which comprises transmitting power in said system by the use of the compound of claim 2 as the operative fluid.

11. The method of operating a fluid hydraulic system which comprises transmitting power in said system by the use of the compound of claim 3 as the operative fluid.

12. The method of operating a fluid hydraulic system which comprises transmitting power in said system by the use of the compound of claim 4 as the operative fluid.

References Cited by the Examiner

UNITED STATES PATENTS

| 2,507,513 | 5/1950 | Goodwin | 260—448.2 |
| 2,507,518 | 5/1950 | Goodwin | 260—448.2 |
| 2,544,079 | 3/1951 | Goodwin | 260—448.2 |
| 2,557,942 | 6/1951 | Clark | 260—448.2 |
| 2,828,279 | 3/1958 | Lewis | 260—448.2 |
| 2,924,574 | 2/1960 | Kaufman | 252—78 |
| 3,019,191 | 1/1962 | Furby et al. | 252—78 |

TOBIAS E. LEVOW, *Primary Examiner.*

SAMUEL H. BLECH, HELEN M. McCARTHY,
*Examiners.*

P. F. SHAVER, *Assistant Examiner.*